Figure 1:
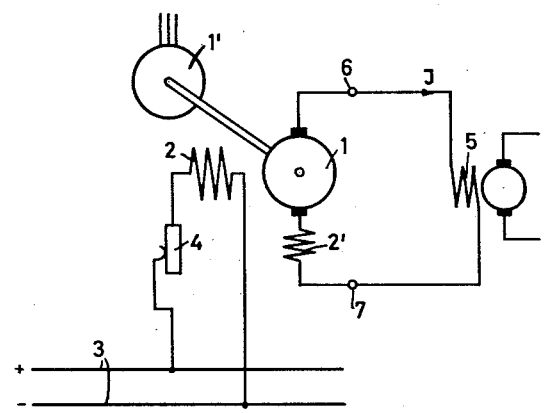

Nov. 27, 1956   F. NECHLEBA   2,772,386
DYNAMOELECTRIC AMPLIFYING MACHINES FOR
CONTROLLING AND REGULATING PURPOSES
Filed Oct. 14, 1953   2 Sheets-Sheet 1

United States Patent Office 2,772,386
Patented Nov. 27, 1956

2,772,386

DYNAMOELECTRIC AMPLIFYING MACHINES FOR CONTROLLING AND REGULATING PURPOSES

Franz Nechleba, Nurnberg, Germany, assignor to Siemens - Schuckertwerke Aktiengesellschaft, Berlin - Siemensstadt, Germany, a corporation of Germany Application October 14, 1953, Serial No. 385,995

6 Claims. (Cl. 322—59)

My invention relates to direct-current generators operating as amplifiers for control and regulating purposes and, more particularly, to amplifying direct-current generators that form part of a Ward-Leonard type system for controlling a variable-voltage load, such as a variable-speed drive of a paper machine, a rolling-mill drive for regulated rolling speed, or similarly generator-controlled machinery.

Such variable-voltage systems comprise one or more separately excited direct-current generators whose field excitation is varied in accordance with the requirements of the desired control and regulating performance. To provide for such a variation, the field circuit of the generator includes a regulator that responds to the particular condition to be attained or maintained; and this regulator must be rated in accordance with the power requirements of the generator excitation to be varied. For keeping the regulatory devices as small as possible, the amplification factor, that is the ratio of the power output of the generator to the power applied as excitation, should be as large as possible. On the other hand, the velocity with which the generator output responds to changes in excitation current increases with a decreasing time constant (time delay) of the excitation circuit. The ratio of amplification factor to time constant is called the "quality factor."

Relating to control and regulating systems of the type above mentioned, it is an object of my invention to design direct-current generator systems in which the quality factor attains a maximum.

To this end, and in accordance with one of the features of my invention, the generator circuits are so electrically rated that the inner resistance in the armature circuit of the generator is at least yearly equal to the ohmic resistance of the external load circuit. Such a machine operates as an amplifying dynamo and may be used in a control or regulating circuit in much the same manner as an electronic amplifier or magnetic amplifier.

The output energy of the generator is equal to the energy induced in the machine minus the energy loss in the machine due to heating caused by the flow of current. The delivered energy, therefore, depends upon the load current and this current, in turn, is dependent upon the external load resistance. Since the quality factor for a given constant value of magnetic field energy supplied to the amplifying machine, is proportional to the output energy, this factor will reach a maximum when the external load resistance is such as to make the output energy a maximum. Under these conditions, the output energy varies in dependence upon the current in accordance with a parabolic curve so that the output energy at first increases with a decreasing external resistance and then again declines when the external resistance more strongly decreases. The maximum value of the output energy and hence of the quality factor lies at the crest point of the parabola. At this point, the output energy is equal to the energy loss in the machine, that is, the external local resistance is equal to the internal resistance of the armature circuit.

The foregoing and more specific objects and features of my invention will be apparent from the following description of the embodiments exemplified by the drawings, in which—

Figure 4:
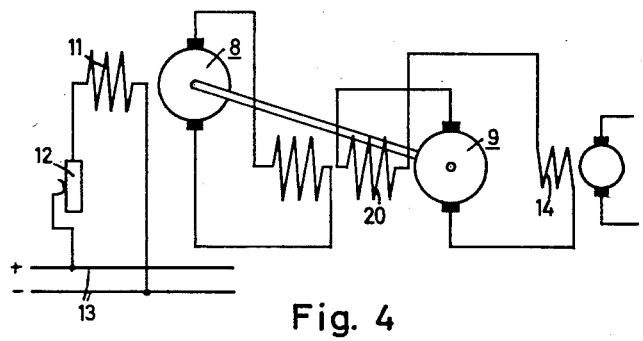
Figure 5:
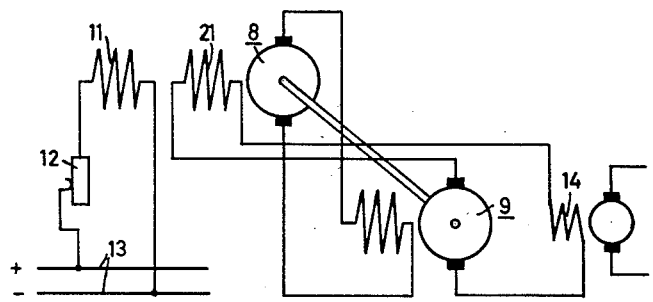
Figure 6:
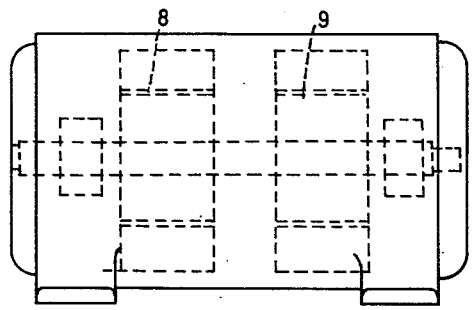

Fig. 1 is a schematic circuit diagram of a single-stage dynamoelectric amplifying system, while Figs. 2 to 5 show four different double-stage amplifying systems, and Fig. 6 shows a dual generator applicable in systems according to Figs. 2 to 5.

The same reference numerals are used in the various illustrations for denoting similar elements respectively.

The single-stage amplifying system according to Fig. 1 has a direct-current generator 1 driven at constant or nearly constant speed, for instance by an asynchronous motor 1'. The generator 1 has a separately excited field winding 2 and a series-connected compensating winding 2'. The field winding 2 is excited from a direct current line 3 through an adjustable control resistor 4. A load 5 having ohmic resistance is connected to the output terminals 6 and 7 of the generator and hence forms part of the armature circuit. The control or regulation of the load current J flowing in the armature circuit is effected by varying the adjustment of control resistor 4. According to the invention, the generator 1 consists of a machine in which the internal resistance of the entire armature circuit, that is the resistance between the generator terminals 6 and 7, is equal or nearly equal to the load resistance 5. Therefore, the generator, normally operating on the straight portion of its magnetic characteristic below saturation, must be rated for continuously carrying the losses and the heat evolving with this load.

Figure 2:
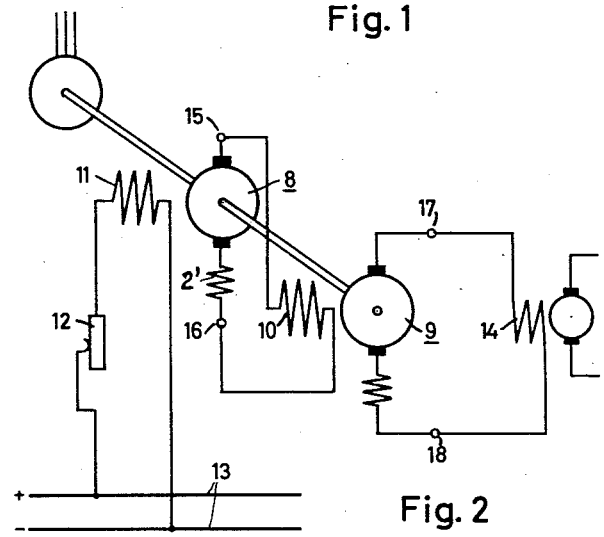

The quality factor can be further improved if, according to another feature of the invention, two direct-current generators of the described resistance rating are interconnected in cascade relation so that the first generator supplies the excitation for the second generator. Such a cascade connection is shown in Fig. 2. The first generator of the cascade is denoted by 8 and the second generator by 9. The field winding 10 of the second generator 9 is excited from the first generator 8. The field winding 11 of the first generator 8 is excited through a control resistor 12 from a direct current line 13. The highest value of the quality factor of the entire cascade system is attained if the internal resistance of generator 8 between its terminals 15 and 16 is equal or nearly equal to the load resistance formed by field winding 10, and if simultaneously the internal resistance of generator 9 between its terminals 17 and 18 is equal or nearly equal to the load resistance 14 of the external armature circuit, both machines operating on the approximately linear, unsaturated portion of the magnetic characteristic.

It is preferable to give the two generators 8 and 9 the same or substantially the same size so that the armatures of both can be placed on a common drive shaft and can be mounted within a common housing. The quality factor of such a two-stage amplifying system is a multiple of the quality factor of the above-described single-stage amplifying system.

With constant quality factors of such an amplifying system, the amplification and the time constant can be varied within certain limits, a higher amplification being accompanied by a larger time constant, and a lower amplification by a smaller time constant. The reduction in time constant can be obtained by connecting a resistance in series with the field winding. The increase in amplification can be obtained by inserting a series winding into the output circuit of the single-stage amplifying machine or into one or both of the two armature circuits of a two-stage machine. That is, with a double-stage machine, an amplification-increasing self-excitation winding may be located in the armature circuit of the first generator, or in the armature circuit of the second generator, or in the armature circuits of both generators. The available possibilities involving such series-connected windings are shown in Figs. 3 to 5.

Figure 3:
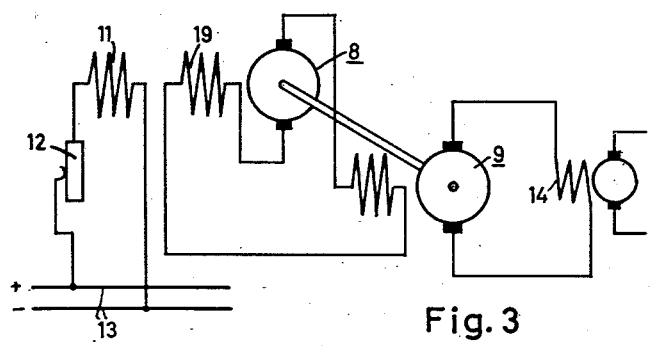

Fig. 3 shows a dynamoelectric cascade system partly similar to that of Fig. 2, but containing a self-excited series winding 19 in the output circuit of the first generator 8. According to Fig. 4, a self-excitation winding 20 is series connected in the output circuit of the second generator 9 and acts cumulatively upon the field excitation of this machine. According to Fig. 5, a self-excited series winding 21 is connected in the output circuit of the second machine 9 and acts upon the field excitation of the first machine 8.

For maintaining the time constant at a small value, it is essential to give the amplifying machines a completely laminated design of their rotor as well as their stator, so that changes in the magnetic flux are not delayed by the formation of eddy currents within massive parts of iron. Also for minimizing the time constant, it is necessary to provide the machines with a compensating winding as known for such purposes (see windings 2' in Figs. 1, 2). If the control or regulating circuit is to be provided with feedback means, or if the amplifying machine is to simultaneously respond to several control signals, then it is necessary to provide the excitation circuit with two or several field windings. Similarly, in a double-stage amplifying machine, the excitation of the first stage and the excitation of the second stage may be provided by means of a plurality of field windings. Such and other modifications will be obvious to those skilled in the art upon a study of this disclosure, and may be made without departure from the essential features of my invention and within the scope of the claims annexed hereto.

I claim:

1. A dynamoelectric amplifying system comprising a first direct-current generator having a separately excited field circuit and a first internal armature circuit, a first external circuit connected with said armature circuit, a second direct-current generator having a field winding forming part of said first external circuit and having a second internal armature circuit, and a second external circuit connected with said second armature circuit and including a load of ohmic resistance, said first armature circuit having an ohmic resistance substantially equal to the resistance of said first external circuit, and said second armature circuit having an ohmic resistance substantially equal to the resistance of said second external circuit.

2. In a dynamoelectric system according to claim 1, said two generators having respective armatures and having a common shaft on which said two armatures are mounted, and said two generators having a common housing enclosing said two armatures.

3. In a dynamoelectric machine according to claim 1, said first generator having a field winding in coactive relation to said separately excited field circuit, said latter field winding being series connected in said second external circuit to form part of said latter circuit.

4. In a dynamoelectric machine according to claim 1, said first generator having a field winding in coactive relation to said separately excited field circuit, said latter field winding being series connected in said first external circuit.

5. In a dynamoelectric machine according to claim 1, said second generator having another field winding in coactive relation to the aforesaid field winding, said other field winding being series connected in said second external circuit and forming part thereof.

6. A dynamoelectric amplifying system, comprising a direct-current generator having a plurality of field windings and having an internal armature circuit including one of said field windings in series, said armature circuit having ohmic resistance, an external circuit loop-connected with said armature circuit, another generator having an armature to provide amplified output and having a field winding forming part of said external circuit, said external circuit having a normally fixed ohmic resistance substantially equal to the ohmic resistance of said internal armature circuit.

References Cited in the file of this patent

UNITED STATES PATENTS 2,338,498     Edwards _____ Jan. 4, 1944